US009065838B2

(12) United States Patent
Turner et al.

(10) Patent No.: US 9,065,838 B2
(45) **Date of Patent: *Jun. 23, 2015**

(54) STREAMING NETWORK CODING

(75) Inventors: Bryan C. Turner, Cary, NC (US); John Toebes, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 13/610,518

(22) Filed: Sep. 11, 2012

(65) Prior Publication Data

US 2013/0067030 A1 Mar. 14, 2013

Related U.S. Application Data

(63) Continuation of application No. 11/812,451, filed on Jun. 19, 2007, now Pat. No. 8,271,687.

(51) Int. Cl.

| | |
|---|---|
| ***G06F 15/16*** | (2006.01) |
| ***H04L 29/08*** | (2006.01) |
| ***H04L 29/06*** | (2006.01) |

(52) U.S. Cl.

CPC .......... *H04L 67/1076* (2013.01); *H04L 65/607* (2013.01); *H04L 67/104* (2013.01); *H04L 67/108* (2013.01)

(58) Field of Classification Search

CPC . H04L 65/607; H04L 67/108; H04L 67/1076; H04L 67/104

USPC .......................................................... 709/217

See application file for complete search history.

(56) References Cited

U.S. PATENT DOCUMENTS

| | | | | |
|---|---|---|---|---|
| 8,271,687 | B2 | 9/2012 | Turner et al. | |
| 2001/0036320 | A1* | 11/2001 | Tan et al. | 382/238 |
| 2002/0161884 | A1* | 10/2002 | Munger et al. | 709/224 |

(Continued)

OTHER PUBLICATIONS

Chou et al., "Practical Network Coding" [online], 2003 [retrieved on Jan. 17, 2007]. Retrieved from the Internet: <URL: http://coblitz.codeen.org:3125/citeseer.ist.psu.edu/cache/papers/cs/31513/hr-rp:zSzzSzresearch.microsoft.comzSz~pachouzSzpubszSzChouWJ03.pdf/chou03practical.pdf>, 10 pages.

(Continued)

*Primary Examiner* — Peter Shaw

(74) *Attorney, Agent, or Firm* — Leon R. Turkevich

(57) ABSTRACT

In one embodiment, a method comprises supplying, by a network node to a peer network node, a randomization seed assigned to the network node for generating a prescribed sequence of pseudorandom numbers according to a prescribed pseudorandom number generation function; encoding each data block having a corresponding position in an ordered sequence of a stream of data blocks, into a corresponding differentially-encoded data block based on applying a product of the corresponding data block and the corresponding pseudorandom number, having the corresponding position in the prescribed sequence, to a corresponding successively-preceding differentially-encoded data block from the prescribed ordered sequence, the data block recoverable solely based on a determined difference between the corresponding differentially-encoded data block and the corresponding successively-preceding differentially-encoded data block relative to the corresponding pseudorandom number; and outputting each differentially-encoded data block in a corresponding packet that identifies the network node and the corresponding position.

19 Claims, 6 Drawing Sheets

(56) References Cited

U.S. PATENT DOCUMENTS

| | | | | |
|---|---|---|---|---|
| 2006/0224760 | A1* | 10/2006 | Yu et al. | 709/231 |
| 2008/0140853 | A1 | 6/2008 | Harrison | |

OTHER PUBLICATIONS

Fragouli et al., “Network Coding: An Instant Primer”, LCA-Report-2005-010 [online], Jan. 2006 [retrieved on Jan. 17, 2007]. Retrieved from the Internet: <URL: http://www.infoscience.epfl.ch/getfile.py?mode=best&recid=58339>, 7 pages.
Chi et al., “Deadline-aware network coding for video on demand service over P2P networks”, Journal of Zhejiang University Science A, Apr. 11, 2006 vol. 7, No. 5, ISSN 1009-3095 (Print), ISSN 1862-1775 (Online), pp. 755-763.
Ho et al., “On Randomized Network Coding”, 2003, available on World Wide Web at mit.edu/trace/www/allerton.pdf, 10 pages.
Sundaram et al., “Multirate Media Streaming Using Network Coding”, Dept. of Electrical and Computer Engineering, University of Wisconsin-Madison, 2006, Available from World Wide Web at web.archive.org/web/20070111203702/http://www.ece.wisc.edu/~wander/papers/rate_sp_05.pdf, pp. 1-10.
Rodriguez, “Avalanche: File Swarming and Network Coding”, Microsoft Research, Retrieved from World Wide Web at research.microsoft.com/~pablo/avalanche.aspx and Printed Jan. 17, 2007, pp. 1-2.

* cited by examiner

48

Source N1 Marix, 56a 70 48

| Pkt. | 0 | 1 | 2 | 3 | 4 | 5 | 6 | 7 | 8 | 9 |
|---|---|---|---|---|---|---|---|---|---|---|
| $P0_1$ | 0 | | | | | | | | | |
| $P1_1$ | 0 | $r_{11}B_1$ | | | | | | | | |
| $P2_1$ | 0 | $r_{11}B_1$ | $r_{12}B_2$ | | | | | | | |
| $P3_1$ | 0 | $r_{11}B_1$ | $r_{12}B_2$ | $r_{13}B_3$ | | | | | | |
| $P4_1$ | X | X | X | X | X | | | | | |
| $P5_1$ | 0 | $r_{11}B_1$ | $r_{12}B_2$ | $r_{13}B_3$ | $r_{14}B_4$ | $r_{15}B_5$ | | | | |
| $P6_1$ | 0 | $r_{11}B_1$ | $r_{12}B_2$ | $r_{13}B_3$ | $r_{14}B_4$ | $r_{15}B_5$ | $r_{16}B_6$ | | | |
| ... | X | X | X | X | X | X | X | X | X | |
| $P9_1$ | 0 | $r_{11}B_1$ | $r_{12}B_2$ | $r_{13}B_3$ | $r_{14}B_4$ | $r_{15}B_5$ | $r_{16}B_6$ | $r_{17}B_7$ | $r_{18}B_8$ | $r_{19}B_9$ |

82 94 14

Source N2 Matrix, 56b

48

| Pkt. | 0 | 1 | 2 | 3 | 4 | 5 | 6 | 7 | 8 | 9 |
|---|---|---|---|---|---|---|---|---|---|---|
| $P0_2$ | 0 | | | | | | | | | |
| ... | X | X | X | | | | | | | |
| $P3_2$ | 0 | $r_{21}B_1$ | $r_{22}B_2$ | $r_{23}B_3$ | | | | | | |
| ... | X | X | X | X | X | X | | | | |
| $P6_2$ | 0 | $r_{21}B_1$ | $r_{22}B_2$ | $r_{23}B_3$ | $r_{24}B_4$ | $r_{25}B_5$ | $r_{26}B_6$ | | | |
| ... | X | X | X | X | X | X | X | X | X | |
| $P9_2$ | 0 | $r_{21}B_1$ | $r_{22}B_2$ | $r_{23}B_3$ | $r_{24}B_4$ | $r_{25}B_5$ | $r_{26}B_6$ | $r_{27}B_7$ | $r_{28}B_8$ | $r_{29}B_9$ |

82 94 14 70

Source N3 Matrix, 56c

48

| Pkt. | 0 | 1 | 2 | 3 | 4 | 5 | 6 | 7 | 8 | 9 |
|---|---|---|---|---|---|---|---|---|---|---|
| $P5_3$ | 0 | $r_{31}B_1$ | $r_{32}B_2$ | $r_{33}B_3$ | $r_{34}B_4$ | $r_{35}B_5$ | | | | |
| ... | X | X | X | X | X | X | X | X | | |
| $P9_3$ | 0 | $r_{31}B_1$ | $r_{32}B_2$ | $r_{33}B_3$ | $r_{34}B_4$ | $r_{35}B_5$ | $r_{36}B_6$ | $r_{37}B_7$ | $r_{38}B_8$ | $r_{39}B_9$ |

$$\begin{bmatrix} r_{14} & r_{15} \\ r_{24} & r_{25} \end{bmatrix} \overset{20}{} \begin{bmatrix} B_4 \\ B_5 \end{bmatrix} \overset{22}{} = \begin{bmatrix} P5_1 - P3_1 \\ P6_2 - P3_2 - r_{26}B_6 \end{bmatrix} \overset{88}{}$$

$$\begin{bmatrix} B_4 \\ B_5 \end{bmatrix} \underset{22}{} = \begin{bmatrix} P5_1 - P3_1 \\ P6_2 - P3_2 - r_{26}B_6 \end{bmatrix} \underset{88}{} \begin{bmatrix} r_{14} & r_{15} \\ r_{24} & r_{25} \end{bmatrix}^{-1} \underset{36}{}$$

Figure 5A $$\begin{bmatrix} r_{17} & r_{18} & r_{19} \\ r_{27} & r_{28} & r_{29} \\ r_{37} & r_{38} & r_{39} \end{bmatrix} \overset{20}{} \begin{bmatrix} B_7 \\ B_8 \\ B_9 \end{bmatrix} \overset{22}{} = \begin{bmatrix} P9_1 - P6_1 \\ P9_2 - P6_2 \\ P9_3 - P5_3 - r_{36}B_6 \end{bmatrix} \overset{88}{}$$

$$\begin{bmatrix} B_7 \\ B_8 \\ B_9 \end{bmatrix} \underset{22}{} = \begin{bmatrix} P9_1 - P6_1 \\ P9_2 - P6_2 \\ P9_3 - P5_3 - r_{36}B_6 \end{bmatrix} \underset{80}{} \begin{bmatrix} r_{17} & r_{18} & r_{19} \\ r_{27} & r_{28} & r_{29} \\ r_{37} & r_{38} & r_{39} \end{bmatrix}^{-1} \underset{36}{}$$

Figure 5B

| Node ID (IP or MAC) Source Addr | Destination (IP or MAC) | Block ID of First Block Enc. in this History | Block ID of Last Block Enc. in this History | Encoded Data Block |
|---|---|---|---|---|
| N=N4 | N5 | $B_F=0$ | $B_L=i$ | $P(i)_N$ |
| 64 | | 68 | 66 | 14 |

$\underbrace{\phantom{XXXXXXXXXXXXXXXXXXXXXXXXXXXXXXXXXXXXXX}}_{40}$

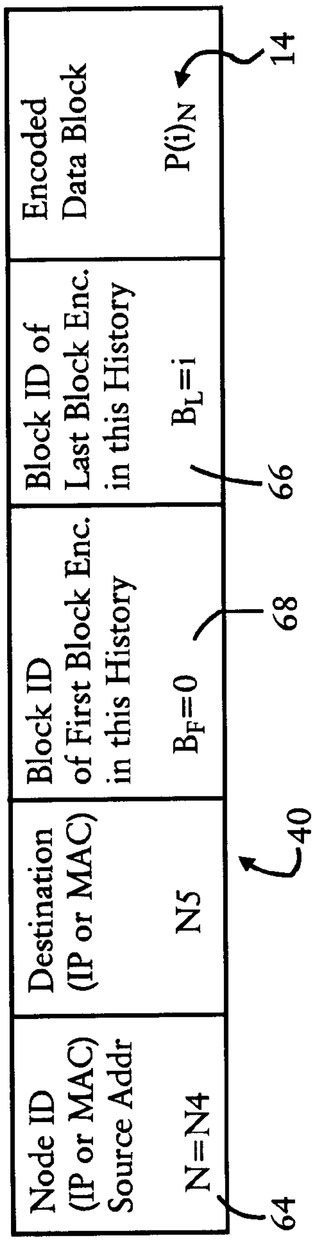

Figure 6A

| Node ID (IP or MAC) Source Addr | Destination (IP or MAC) | Block ID of First Block Enc. in this History | Block ID of Last Block Enc. in this History | Block ID of Last Partially Enc. Block | Coeffs. for Each Partial Block | Encoded Data Block |
|---|---|---|---|---|---|---|
| N=N4 | N5 | $B_F=0$ | $B_L=i$ (e.g., i=3) | $B_P=k$ (e.g., 5) | $r_{14}, r_{15}$ | $P'(k)_N$ |
| 64 | | 68 | 66 | 69 | 14 | 14' |

$\underbrace{\phantom{XXXXXXXXXXXXXXXXXXXXXXXXXXXXXXXXXXXXXXXXXXXXXXXX}}_{42}$

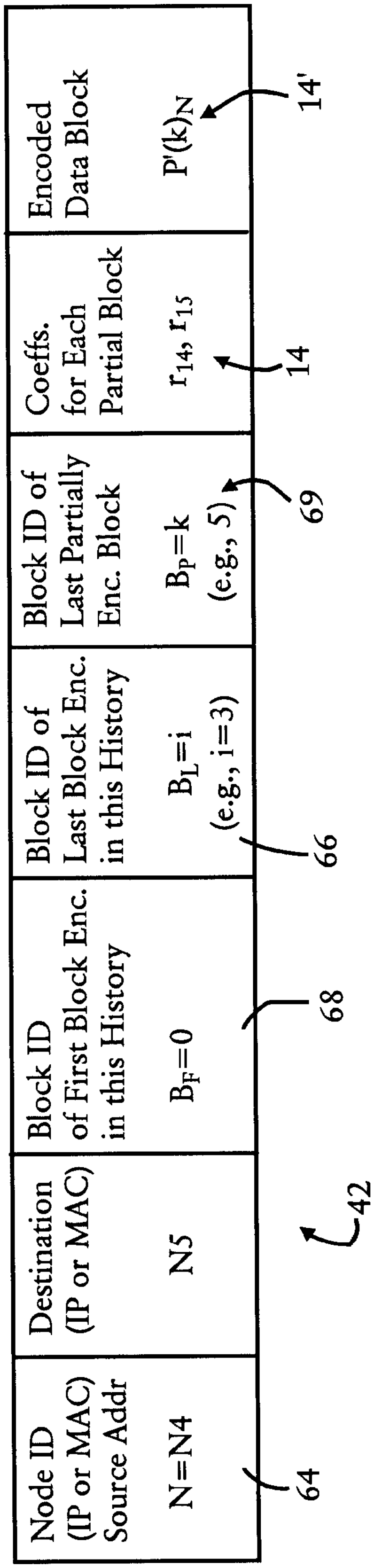

Figure 6B

STREAMING NETWORK CODING

This application is a continuation of commonly-assigned, copending application Ser. No. 11/812,451, filed Jun. 19, 2007.

TECHNICAL FIELD

The present disclosure generally relates to peer-to-peer transport of streaming media using network coding.

BACKGROUND

Streaming data to multiple endpoints at the same time under real-time constraints requires specialized protocols. One attempt to stream data (e.g., voice or video data) to endpoints in a network involves connecting all endpoints to a single cluster of machines which share the content being distributed (referred to as the single-source point-to-point solution); alternatively advanced network elements may be used for multicasting, where packets are duplicated in the network elements as needed to reach each endpoint (referred to as the single-source multicast solution).

Network coding is a technique of in-network re-coding of source packets for distribution among network elements: peer network elements produce linear combinations (P) of a prescribed number (n) of data blocks (B) based on applying sets of randomized coefficients (x), where each block of data ($B_j$) is encoded into each encoded data structure (P(i)) according to the equation:

$$P(i) = \sum_{j=1}^{n} x_{ij} * B_j, \tag{1}$$

where "i" identifies a packet sequence (i=1 to m, where "m" is the number of encoded packets such that m≥n), "$x_{ij}$" is a random coefficient multiplied with the corresponding data block "$B_j$" (the symbol "*" denotes multiplication), and "n" is the number of data blocks (B) that are being encoded to generate the linear combination P(i). Hence, the m-dimensional vector of encoded data structures P is generated from applying the m-by-n matrix of random coefficients X to the n-dimensional vector of data blocks B, resulting in the linear vector equation:

$$P=X*B \tag{2}.$$

Consequently, a network element can output a number (m≥n) of data packets, where each data packet includes a data structure "P(i)" and the corresponding set of randomized coefficients (e.g., $x_{i1}, x_{i2}, x_{i3}, \ldots, x_{in}$) used to generate the corresponding data structure "P(i)". Once a receiver has received at least "n" number of data packets having unique data structures "P(i)", the receiver can apply linear algebra to rebuild the matrix of random coefficients (X), determine the inverse matrix ($X^{-1}$) of the matrix of random coefficients (X) (e.g., using Gaussian elimination) to obtain the Identity Matrix I (i.e., coefficients equal to 1 only along the diagonal and zero elsewhere) based on applying "m" equations to "n" unknowns, and recover the vector of data blocks B based on determining the inverse matrix ($X^{-1}$), where:

$$X*X^{-1}=I (I=\text{The Identity Matrix}), \text{ and}$$

$$B=P*X^{-1} \tag{3}.$$

BRIEF DESCRIPTION OF THE DRAWINGS

Reference is made to the attached drawings, wherein elements having the same reference numeral designations represent like elements throughout and wherein:

FIG. 4 illustrates example decoding matrices stored within the memory circuit of the network node of FIG. 2, according to an example embodiment.

FIGS. 5A and 5B illustrate example decoding by the network node of FIG. 2 based on applying encoded data elements from multiple network nodes, according to an example embodiment.

FIGS. 6A and 6B illustrate an example conservatively encoded packet and an aggressively encoded packet, respectively, according to an example embodiment.

DESCRIPTION OF EXAMPLE EMBODIMENTS

Overview

Figure 1:
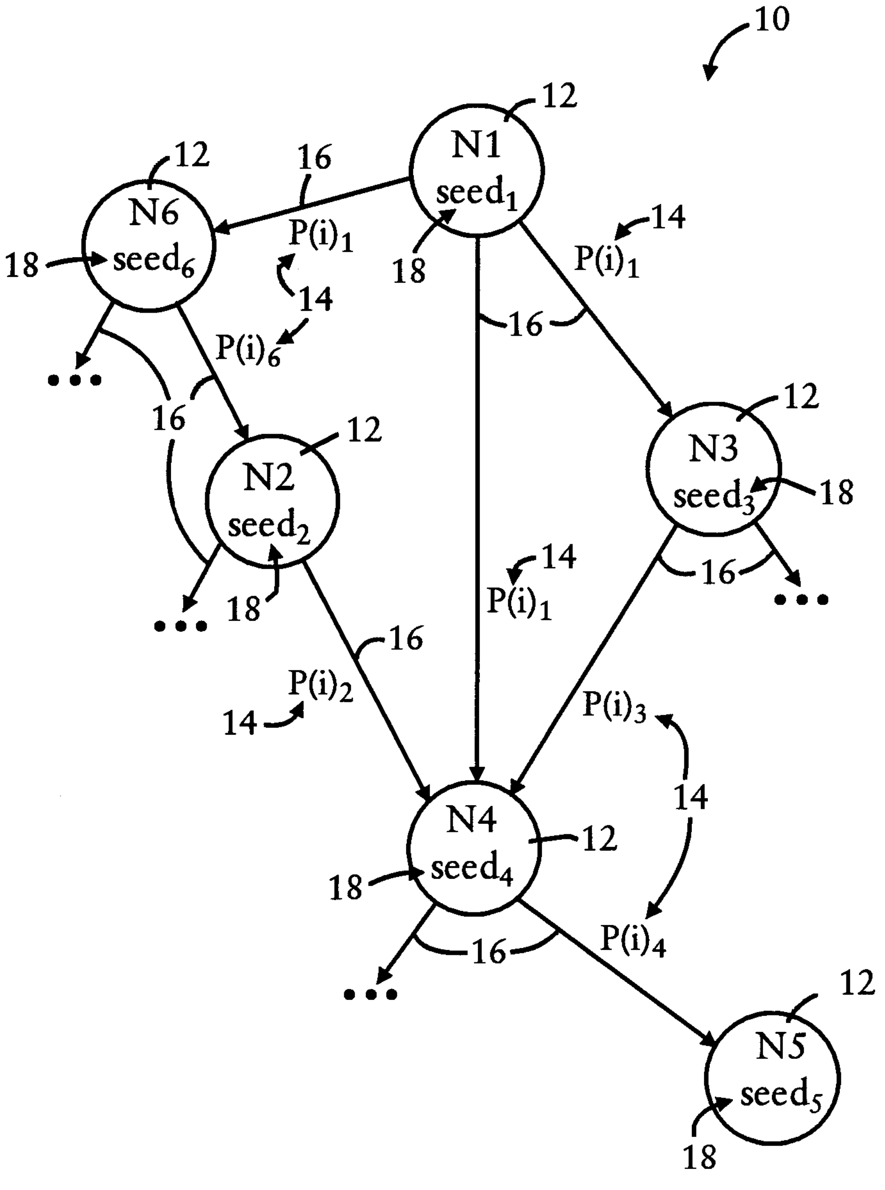
FIG. 1 illustrates an example system having multiple network nodes for implementing streaming network coding based on outputting packets carrying differentially-encoded data structures based on prescribed node-specific randomization coefficients, according to an example embodiment.

In one embodiment, a method comprises supplying, by a network node to a peer network node, a randomization seed assigned to the network node for generating a prescribed sequence of pseudorandom numbers according to a prescribed pseudorandom number generation function; encoding each data block having a corresponding position in an ordered sequence of a stream of data blocks, by the network node into a corresponding differentially-encoded data block based on applying a product of the corresponding data block and the corresponding pseudorandom number, having the corresponding position in the prescribed sequence, to a corresponding successively-preceding differentially-encoded data block from the prescribed ordered sequence, the data block recoverable solely based on a determined difference between the corresponding differentially-encoded data block and the corresponding successively-preceding differentially-encoded data block relative to the corresponding pseudorandom number; and outputting, by the network node, each differentially-encoded data block in a corresponding packet that identifies the network node and the corresponding position.

In another embodiment, an apparatus comprises a network interface circuit configured for supplying, by a network node to a peer network node, a randomization seed assigned to the network node for generating a prescribed sequence of pseudorandom numbers according to a prescribed pseudorandom number generation function, and an encoding circuit. The encoding circuit is configured for encoding each data block having a corresponding position in an ordered sequence of a stream of data blocks, into a corresponding differentially-encoded data block based on applying a product of the corresponding data block and the corresponding pseudorandom number, having the corresponding position in the prescribed sequence, to a corresponding successively-preceding differentially-encoded data block from the prescribed ordered sequence, the data block recoverable solely based on a determined difference between the corresponding differentially-encoded data block and the corresponding successively-preceding differentially-encoded data block relative to the corresponding pseudorandom number. The network interface circuit further is configured for outputting each differentially-encoded data block in a corresponding packet that identifies the network node and the corresponding position.

DETAILED DESCRIPTION

Particular embodiments enable network nodes to provide streaming network coding, based on each network node selecting a unique randomization seed for generating a prescribed sequence of pseudorandom numbers according to a prescribed pseudorandom number generation function: each network node can recombine each received data block into a new encoded data block based on the corresponding randomization using the corresponding randomization seed, guaranteeing that each encoded data block output by a network node has a high probability of being unique relative to any other encoded data block output by any other network node.

Particular embodiments also enable the network nodes to provide streaming network coding based on each network node exchanging its unique randomization seed with other network nodes, enabling any network node having received a data packet carrying an encoded data block to regenerate the prescribed sequence of pseudorandom numbers used to generate the encoded data block, based on identifying the sourcing network node having generated the encoded data block contained within the received packet.

Streaming network data requires an ordered sequence within the stream of data blocks, hence particular embodiments enable each data block within the stream of data blocks to be encoded based on its corresponding position within the ordered sequence within the stream, where each data block is encoded relative to the encoding provided to its corresponding successively-preceding data block. In particular, each data block can be encoded into a differentially-encoded data block based on multiplying the data block with the pseudorandom number having the same corresponding position in the pseudorandom number sequence as the corresponding position of the data block within the sequence of data blocks, where the pseudorandom number is generated using the corresponding randomization seed of the network node. The term "pseudorandom" as used herein refers to the generation of numbers mimicking randomness by a prescribed computational circuit, identified herein as a pseudorandom number generator, that applies the corresponding randomization seed. Since each data block can have a corresponding pseudorandom number based on its corresponding position within the stream of data blocks, each data block can be encoded based on multiplying the data block with its corresponding pseudorandom number, and applying that multiplication product of the data block and its corresponding pseudorandom number to the successively-preceding encoded data block from the ordered sequence, resulting in a differentially-encoded data block.

Consequently, any receiving node can determine any pseudorandom number generated by a sourcing network node for a differentially-encoded data block based on applying the corresponding randomization seed, and the relative position of the differentially-encoded data block within the ordered sequence of the stream of data blocks. Hence, the receiving node can decode the differentially-encoded data block solely based on determining the difference between the differentially-encoded data block and its corresponding successively-preceding differentially-encoded data block, relative to the corresponding pseudorandom number multiplied to the original data block. The recalculation of the pseudorandom number sequence of the sourcing network node based on the receiving node applying the corresponding randomization seed of the sourcing network node eliminates the necessity of the receiving node receiving any random coefficients from any encoding source, resulting in improved network efficiency by minimizing the transfer of random coefficients throughout a network. Further, the use of distinct randomization seeds by each sourcing network node guarantees that every encoded block transmitted on the network has a high probability of being unique among multiple nodes, improving network efficiency. Further, the differentially-encoded data blocks eliminate the requirement of relying on "make-up" packets to recover the encoded data in the case that a packet was lost.

FIG. 1 is a diagram illustrating an example network 10 having multiple peer network nodes 12 configured for distributing streams of differentially-encoded data blocks 14, according to an example embodiment. Each of the peer network nodes 12 can be connected via physical layer links 16, for example wired or wireless IEEE 802 links. Each of the peer network nodes 12 also can be configured for bidirectional communications, including sending and receiving the differentially-encoded data blocks 14 between each other based on encoding the data blocks using a corresponding randomization seed 18.

Each of the differentially-encoded data blocks "$P(i)_N$" 14 output by a given sourcing network node 12 can be uniquely identified by any network node 12, where "N" refers to the node identifier of the sourcing network node 12 having generated the differentially-encoded data block "$P(i)_N$" 14, and "i" identifies the corresponding position of the differentially-encoded data block "$P(i)_N$" 14 within the ordered sequence of the stream of data packets that form the media stream. For example, a differentially-encoded data block "$P(\mathbf{3})_1$" (also described herein as "$P\mathbf{3}_1$") refers to the third differentially-encoded data block (i=3) in the ordered sequence of data blocks and encoded by the network node "N1" (N=1). Each peer network node (e.g., "N1") 12 has a corresponding unique assigned randomization seed (e.g., "$seed_1$") 18 for generating the ordered sequence of differentially-encoded data blocks "$P(i)_N$" (e.g., "$P(i)_1$") 14, where the reference "i" refers to the corresponding position of the encoded data block within the ordered sequence of the stream of data blocks that form the media stream, in the corresponding position of the pseudorandom number in the pseudorandom number sequence generated according to the assigned randomization seed 18. A seed 18 is "assigned" to a given network node 12 in that an identifiable association is established between a given network node (e.g., "N1") 12 and its corresponding seed (e.g., "$seed_1$") 18: it will be readily apparent that the "assignment" (i.e., the identifiable association) between the node 12 and its corresponding seed 18 can be established, for example, by the node 18 dynamically and/or arbitrarily selecting its own seed value (e.g., based on its corresponding IP address, Layer 2 Media Access Controller (MAC) address, etc.), and need not be established based on a predetermined assignment by an external entity. Hence the term "assigned" or "assignment" as used herein refers to the identifiable association established between a given network node 12 and the corresponding seed 18, and does not limit the manner in which the identifiable association is established. Each network node 12 that outputs an encoded data stream (i.e., a "sourcing network node") can exchange its corresponding randomization seed 18 with any network node 12 that will be receiving the corresponding encoded data stream from the sourcing network node (i.e., "receiving network node"); for example, the network node "N1" 12 needs to send its corresponding randomization seed "$seed_1$" 18 to enable its receiving network nodes "N3", "N4", and "N6" 12 to decode the encoded data stream from the sourcing network node "N1" 12. In contrast, the sourcing network node "N6" only needs to send its corresponding randomization seed "$seed_6$" 18 to the receiving node "N2" (and any other directly-connected receiving node not shown in FIG. 1). Hence, any receiving network node (e.g., N4) 12 can determine the pseudorandom number "$r_{Ni}$," 20 (illustrated in FIG. 2) used by any of its sourcing network nodes (e.g., N1: N=1) 12 in generating a differentially-encoded data block 14, based on the receiving network node determining the identity (e.g., N=1) of the sourcing network node, and the corresponding position (i) of the differentially-encoded data block 14 within the ordered sequence of the stream of data blocks.

Figure 2:
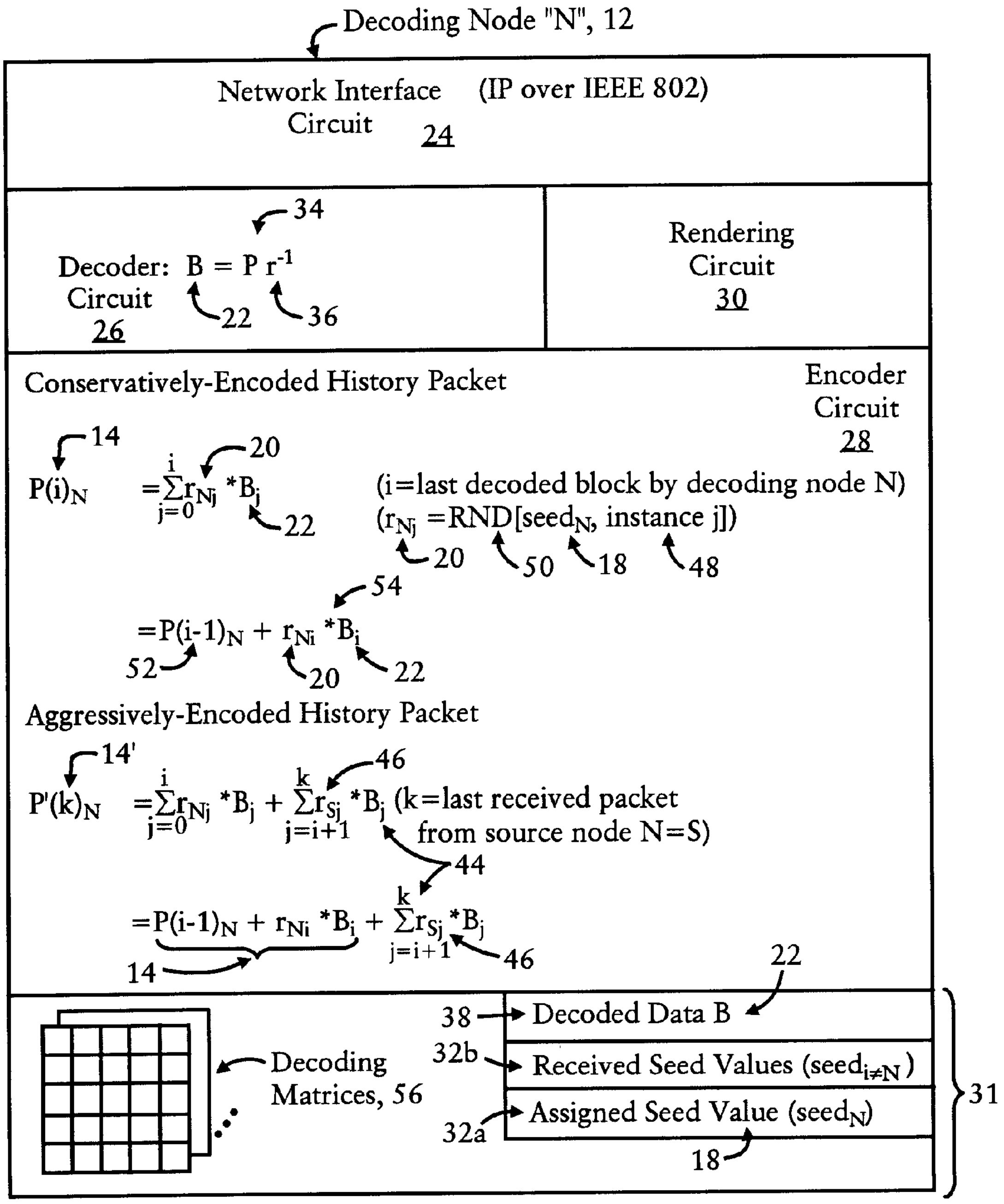
FIG. 2 illustrates an example network node from the system of FIG. 1, according to an example embodiment.

FIG. 2 illustrates an example network node 12 configured for decoding data blocks 22 from received differentially-encoded data blocks, and encoding each data block 22 into a new differentially-encoded data block using the corresponding assigned randomization seed 18, according to an example embodiment. Each network node 12 can include a network interface circuit 24, a decoding circuit (i.e., decoder circuit) 26, an encoder circuit 28, a rendering circuit 30, and a memory circuit 31. The encoder circuit 28 and the decoder circuit 26 are illustrated as distinct circuits for use of illustration, however the encoder circuit 28 and the decoder circuit 26 also can be implemented within a single circuit that shares circuit components.

The network interface circuit 24, implemented for example as an IEEE 802 wired (e.g., IEEE 802.3) or wireless (e.g., IEEE 802.11) interface, can be configured for supplying to each peer network node 12 its corresponding assigned seed value "$seed_N$" 18, stored within the memory circuit 31 in a memory register circuit 32*a*, and receiving from the peer network nodes their respective assigned seed values, illustrated in FIG. 2 as the received seed values "$seed_{i \neq N}$"18' stored in the memory register circuit 32*b*.

The network interface circuit 24 also can be configured for receiving data packets from at least one sourcing network node 12, where the data packets carry respective differentially-encoded data blocks 14 having been encoded by the sourcing network node 12. As described in further detail below, the decoder circuit 26 can be configured for obtaining the vector (B) of decoded data blocks 22 based on decoding the vector (P) 34 of received differentially-encoded data blocks 14 using the inverse matrix ($r^{-1}$) 36 of pseudorandom coefficients 20 having been used to generate the encoded data blocks; as described below with respect to the encoder circuit 28, the use of differential encoding enables a data block 22 to be decoded from two successive (i.e., adjacent) differentially-encoded data blocks from the same sourcing network node 12. Hence, the decoder circuit 26 can apply differential decoding to recover the data blocks 22 for storage in a cache memory 38 and rendering by the rendering circuit 30. The network interface 24 also can be configured for outputting each differentially-encoded data block 14 generated by the encoder circuit 28 in a corresponding packet that identifies the network node 12 and the corresponding position of the differentially-encoded data block 14. As described below with respect to FIGS. 6A and 6B, the network interface 24 can output a first packet 40 containing a conservatively-encoded data block 14 that includes the data blocks encoded by the network node 12, or a second packet 42 containing an aggressively-encoded data block 14' that includes not only the data blocks 22 encoded by the network node 12, but also partially-decoded data elements 44 (illustrated in FIG. 2) having been encoded by another sourcing network node, plus the respective coefficients 46 having been used by the other sourcing network node in encoding the partially-decoded data elements 44.

The encoder circuit 28 is configured for encoding each data block ($B_i$) 22 into a corresponding differentially-encoded data block ($P(i)_N$) 14 based on multiplying the data block ($B_i$) 22 with the pseudorandom number ($r_{Ni}$) 20 generated by the pseudorandom number generator 50 and having the same corresponding position (e.g., "instance j") 48 in the pseudorandom number sequence as the corresponding position of the data block ($B_i$) 22 within the sequence of data blocks ($B_j$, where j=0 to i); the product ($r_{Ni}*B_i$) 54 of the data block ($B_i$) 22 and the corresponding pseudorandom number ($r_{Ni}$) 20 for the corresponding position ("i") (illustrated as instance j 48 in the pseudorandom number generator 50) is added to the history of all prior data blocks 22, multiplied by their respective pseudorandom numbers 20 ($r_{Nj}*B_j$, where i=0 to i−1), in the ordered sequence of the stream of data blocks:

$$P(i)_N = \sum_{j=0}^{i} r_{Nj} * B_j, \tag{4}$$

where "i" is the last fully decoded block in the ordered sequence of the stream of data blocks obtained by the decoding the node N, and "$r_{Nj}$" is the sequence of all pseudorandom numbers generated by the pseudorandom number generator 50 using its assigned seed 18, up to and including the last ending position of the data block being encoded (j=0 to i). The initial data block can be a null block having a zero value ($B_i=0$). Hence, the history of all prior data blocks ($r_{Nj}*B_j$, where j=0 to i−1)) equals the successively-preceding differentially-encoded data block ($P(i-1)_N$) 52 from the prescribed ordered sequence:

$$P(i-1)_N = \sum_{j=0}^{i-1} r_{Nj} * B_j. \tag{5}$$

Hence, the encoded data block ($P(i)_N$) 14 can be obtained by adding the product ($r_{Ni}*B_i$) 54 to the prior encoded data block $P(i-1)_N$ 52, such that the encoded data block ($P(i)_N$) 14 is a differentially-encoded data block relative to its successively-preceding differentially-encoded data block $P(i-1)_N$ 52.

Hence, each differentially-encoded data block ($P(i)_N$) 14 contains the history of the respective products ($r_{Nj}*B_j$) 54 of all prior blocks 22 multiplied by their respective pseudorandom coefficients ($r_{Nj}$) 20. Further, the pseudorandom number coefficients ($r_{Nj}$) 20 are repeatable by any network node 12 applying the corresponding seed value 18 of the sourcing network node to the prescribed randomization function 50, in order to obtain the corresponding pseudorandom number coefficient ($r_{Nj}$) 20 for the identified network node (N) at the specified instance (i) (i.e., the position within the prescribed ordered sequence) 48. Consequently, the identification of the packet source, and the corresponding position 48 of the differentially-encoded data block ($P(i)_N$) 14 enables any receiving node 12 to determine the corresponding pseudorandom coefficient 20, without the necessity of the sourcing network node providing the pseudorandom coefficients, as required under existing network coding techniques.

As a result, a receiving node (e.g., N4) 12, in response to receiving two successive (i.e., adjacent) differentially-encoded data blocks (e.g., $P(i)_N$ and $(P(i-1)_N)$ 14 can instantly decode the data block $(B_i)$ 22 based on calculating the difference of the successive differentially-encoded data blocks relative to the determined pseudorandom coefficient:

$$B_i=[P(i)_N-P(i-1)_N]/r_{Ni} \quad (6).$$

Since any two differentially-encoded data blocks from the same sourcing network node (N) can be used to obtain valid information from the received differentially-encoded data blocks, a network node receiving two successive differentially-encoded data blocks from the same sourcing network node can instantaneously begin decoding and rendering the data block using the rendering circuit 30, without the necessity of receiving a prescribed number of encoded blocks preceding the received differentially-encoded data blocks. As described in further detail below, even if a receiving network node (e.g., N4) 12 does not receive all the differentially-encoded data blocks 14 from a sourcing network node (e.g., N1) 12, a receiving network node can cache the differentially-encoded data blocks 14 received from another sourcing network node (e.g., N2, N3) in decoding matrices 56 to determine the inverse matrix 36 for recovering the original data blocks 22 from the differentially-encoded data blocks 14, described in further detail below.

Any of the disclosed circuits of the network node (including the network interface circuit 24, the decoder circuit 26, the encoder circuit 28, the rendering circuit 30, and the memory circuit 31, and their associated components) can be implemented in multiple forms, including hardware logic that is implemented in a logic array such as a programmable logic array (PLA), a field programmable gate array (FPGA), or by mask programming of integrated circuits such as an application-specific integrated circuit (ASIC); any of these circuits also can be implemented using a software-based executable resource that is executed by a corresponding internal processor such as a microprocessor (not shown), where execution of executable code stored in internal memory (e.g., within the memory circuit 31) causes the processor to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 31 can be implemented as a memory, for example an EPROM, a DRAM, etc.

Further, any reference to "outputting a message" or "outputting a packet" can be implemented based on creating the message/packet in the form of a data structure and storing that data structure in a tangible memory medium in the disclosed apparatus (e.g., in a transmit buffer), and electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" can be implemented based on the disclosed apparatus detecting the electrical (or optical) transmission of the message/packet on the communications medium, and storing the detected transmission as a data structure in a tangible memory medium in the disclosed apparatus (e.g., in a receive buffer).

Figure 3:
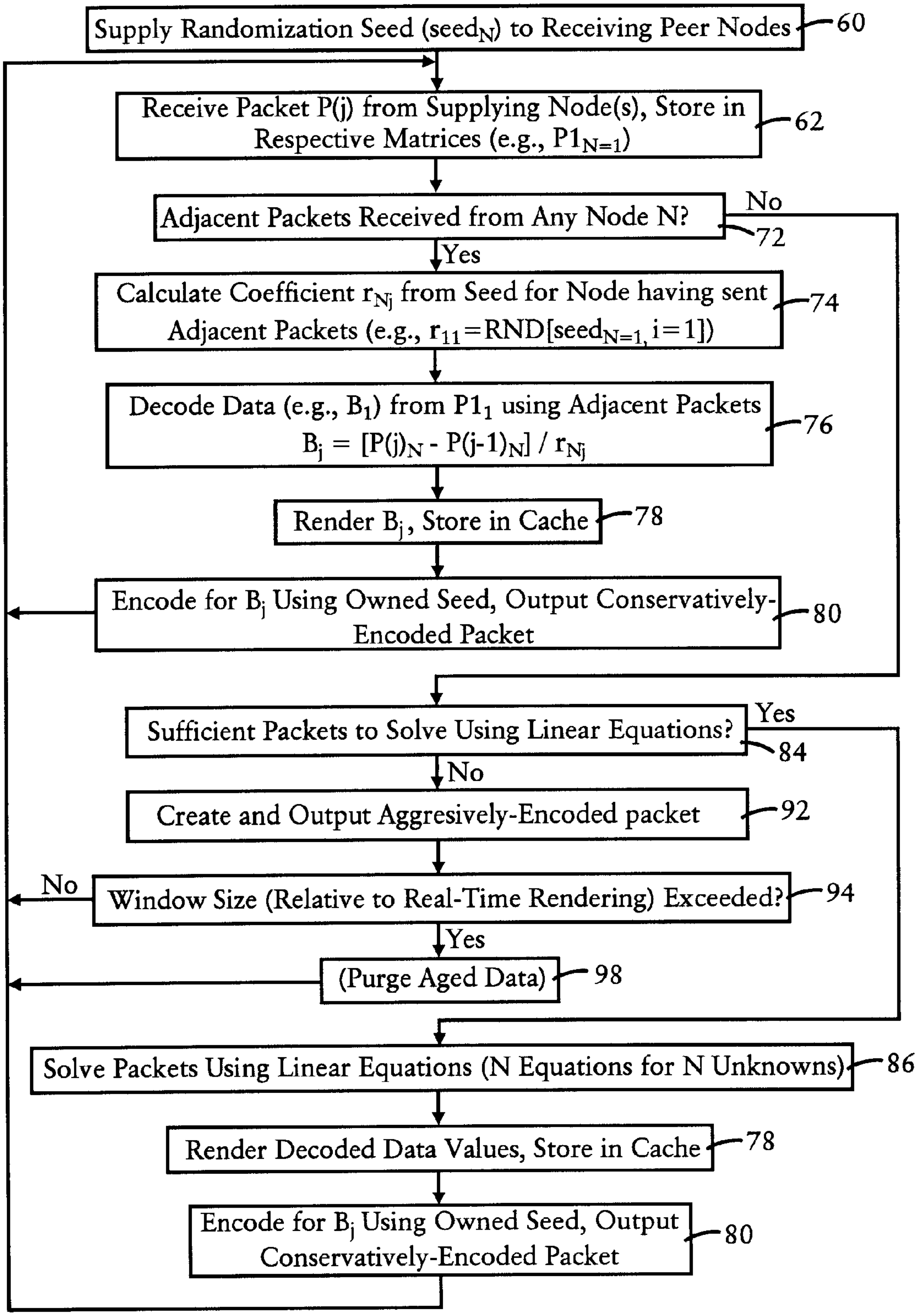
FIG. 3 illustrates an example method by the network node of FIG. 2, according to an example embodiment.

FIG. 3 illustrates an example method by a network node (e.g., "N4") 12 of FIGS. 1 and 2 of decoding received encoded data blocks, and recoding the decoded data blocks for distribution to other peer nodes, according to an example embodiment. The steps described in FIG. 3 can be implemented as executable code stored on a computer readable medium (e.g., floppy disk, hard disk, EEPROM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

As illustrated in FIG. 3, the method can begin in step 60 by the network interface circuit 24 supplying its randomization seed 18 to the receiving peer nodes via the link layer connections 16; alternately, the network nodes 12 can be supplied the respective seed values 18 for all of the connected network nodes using alternative techniques, for example receiving the seed values 18 for all the connected network nodes from a centralized server, or based on manual input by a network administrator. At a minimum, however, a given network node should have access to at least its own seed value 18, and the seed values of directly-connected peer nodes that supply packets carrying encoded data blocks 14 having been encoded by the directly-connected peer nodes (also referred to as sourcing network nodes).

In response to the network interface circuit 24 of the network node (e.g., N4) receiving a packet 40 (illustrated for example in FIG. 6A) from a sourcing network node (e.g., N1) in step 62, the network interface circuit 24 can store the differentially-encoded data block 14 supplied in the data packet 40 into a selected decoding matrix (e.g., 56*a*) based on the packet 40 specifying a corresponding node identifier field (e.g., N=1) 64, and a block identifier field 66 identifying the last block encoded in the corresponding differentially-encoded data block 14 supplied in the packet 40. Since packets can be received by a receiving node out of order relative to the transmission sequence by the sourcing network node, the block identifier field 66 enables the receiving network node to properly identify the last fully-encoded data block in the data structure 14. Further, the packet 40 can include a block identifier 68 that identifies the first block encoded in the differentially-encoded data structure 14: normally the block identifier 68 typically will be set to zero representing the beginning of the ordered sequence of the stream of data blocks, although the block identifier also can have a nonzero value, for example in the case of resuming an interrupted media stream.

Assuming in step 62 that the network interface circuit 24 receives a packet 40 having a node identifier 64 specifying the sourcing network node "N1", the decoder circuit 26 can parse the packet 40 and store the supplied data structure (e.g., $P\mathbf{0}_1$) 14 into the decoding matrix 56*a* for the corresponding sourcing network node at the corresponding position 48 within the ordered sequence, illustrated in FIG. 4.

FIG. 4 illustrates example decoding matrices 56 configured for storing differentially-encoded data blocks 14, and determined partially decoded data elements 70 that are determined by the decoder circuit 26 from partial decoding of the differentially-encoded data blocks 14, according to an example embodiment. FIG. 4 illustrates decoding matrices 56*a*, 56*b*, and 56*c* in the memory circuit 31 of the receiving network node "N4" for storing the differentially-encoded data blocks 14 and the associated partially decoded data elements 70 obtained from the sourcing network nodes "N1", "N2", and "N3" of FIG. 1. In particular, the decoder circuit 26 of the decoding network node "N4" initially stores the received differentially-encoded data blocks 14 into the corresponding matrix 56, based on the sourcing network node having encoded the differentially-encoded data blocks; hence, all the differentially-encoded data blocks $(P(i)_1)$ 14 encoded by source N1 are stored by the decoder circuit 26 of node "N4" in the decoding matrix 56*a*, the differentially-encoded data blocks $(P(i)_2)$ 14 encoded by source N2 are stored by the decoder circuit 26 of node "N4" in the decoding matrix 56*b*, and the differentially-encoded data blocks $(P(i)_3)$ 14 encoded by the source N3 are stored by the decoder circuit 26 of node "N4" in the decoding matrix 56*c*. As illustrated in FIG. 4, the receiving network node (N4) does not receive all the transmit packets from any one source, but rather encounters packet loss (e.g., packets $P4_1$, $P7_1$, and $P8_1$ are lost) with respect to the sourcing network node N1, and only receives sporadic packets from the sourcing network nodes N2 and N3.

Each of the partially decoded data elements 70 correspond to the products 54 generated in the sourcing network node 12, as illustrated in FIG. 2. As described above with respect to FIG. 2, the initial packet $(P0_N)$ of any node N can be a null packet, such that the corresponding encoded packet at position "0" 48 in the sequence of the data blocks has a value of zero. In this case, the next received differentially-encoded data block "$P1_1$" 14 received in step 62 of FIG. 3 from the same sourcing network node "N1" 12 will equal the product "$r_{11}B_1$" 70.

In response to the decoder circuit 26 detecting in step 72 the presence of adjacent packets 40 received from the node "N1" based on the storage in the decoding matrix 56*a* of the adjacent differentially-encoded data blocks "$P0_1$" and "$P1_1$" 14, the decoder circuit 26 can decode the data block "$B_1$" in steps 74 and 76. In particular, the specific decoding matrix 56*a* is associated with the sourcing network node "N1", and the corresponding position 48 by column or row enables the decoder circuit 26 in the decoding node (e.g., N4) to determine the pseudorandom coefficient "$r_{11}$" 20 by applying the corresponding seed value 18 within its pseudorandom number generator 50 for the corresponding instance 48 (e.g., $r_{N=1,\ i=1}$=RND[$seed_{N=1}$, instance i=1]). Consequently, the decoder circuit 26 can solve for the first data block "$B_1$" 22 in step 76 according to equation (6) above, which can be expressed in this example as:

$$B_1=[P1_1-P0_1]/r_{11} \quad (7),$$

where the pseudorandom number coefficient "$r_{11}$" 20 is determined by the decoder circuit 26.

Hence, the decoder circuit 26 can solve for the first data block "$B_1$" in step 76 based solely on the determined difference between the corresponding differentially-encoded data block "$P1_1$" 14 and its corresponding successively-preceding differentially-encoded data block "$P0_1$" 14 relative to the corresponding pseudorandom number "$r_{11}$" 20 used to encode the first data block "$B_1$" 22, enabling the rendering circuit 30 to begin rendering the decoded data block "$B_1$" 22 in step 78. The decoder circuit 26 also caches the decoded data block "$B_1$" 22 into the decoded data cache 38 in step 78 for subsequent decoding operations, described below.

In response to the completed decoding of the first data block "$B_1$" 22, for example based on the first decoded data block being stored in the decoded data cache 38, the encoder circuit 28 in the receiving network node "N4" can encode the decoded data "$B_1$" 22 into its own differentially-encoded data block "$P1_{N=4}$" 14 in step 80 using its own corresponding seed value ("$seed_4$") 18 stored in the register 32*a* of FIG. 2 (e.g., $P1_4=P0_4+r_{41}*B_1$) and output a conservatively-encoded history packet 40, illustrated in FIG. 6A, that contains the differentially-encoded data block "$P1_4$" 14.

The receiving network node "N4" 12 can continue to receive packets in step 62 and populate the associated decoding matrices 56*a*, 56*b*, and 56*c*, as illustrated in FIG. 4. Hence, the receiving network node "N4" 12 can also decode in steps 74 and 76 the second data block "$B_2$" 22 based on the adjacent differentially-encoded data blocks "$P1_1$" and "$P2_1$" 14 from the sourcing network node "N1" 12, and the third data block "$B_3$" 22 based on the adjacent differentially-encoded data blocks "$P2_1$" and "$P3_1$" 14 from the sourcing network node "N1" 12. Hence, the data blocks "$B_2$" and "$B_3$" 22 each can be rendered in step 78, stored in the cache 38, and encoded by the encoder circuit 28 as respective differentially-encoded data blocks "$P2_4$" and "$P3_4$" 14 in step 80 for retransmission to another peer network node.

As illustrated in FIG. 4, the decoding network node "N4" does not receive the differentially-encoded data blocks "$P4_1$", "$P7_1$" or "$P8_1$" from the sourcing network node "N1" 12; since the decoding matrix 56*a* does not have adjacent (i.e., corresponding successively-preceding) differentially-encoding data blocks for the stored differentially-encoded data block "$P5_1$" 14, the decoding circuit 26 in step 72 does not decode the data block "$B_5$" 22 using the differential decoding in step 76, rather, the source matrix 56 can store bound partially decoded data elements 82 in the decoding matrix 56*a*, where the decoding circuit 22 lacks sufficient information in the decoding matrix 56*a* to solve all for the unknown values for the data blocks "$B_4$" and "$B_5$" 22.

The decoder circuit 26 can apply linear algebra operations in step 84 to solve in step 86 for the unknown variables in the bound partially decoded data elements 82 based on using the bound partially decoded data elements 82 from the source matrix 56*b*, solving for the linear equations as illustrated in FIG. 5A. As illustrated in FIG. 5A, the decoder circuit 26 can solve for the vector of data blocks 22 after receiving the differentially-encoded data block "$P6_1$" 14 to solve for the data block "$B_6$" 22 in step 76. In particular, once the decoder circuit 26 has solved for the data block "$B_6$", the decoder circuit 26 can generate a vector of known data values 88, enabling the decoder circuit 26 to determine an inverse matrix 36 relative to the corresponding pseudorandom number coefficient matrix 20 of FIG. 5A. Hence, the decoder circuit 26 can solve for the two unknowns using two equations, based on applying the values of the received encoded data blocks "$P3_1$", "$P5_1$", "$P6_1$" (used to determine "$B_6$"), "$P3_2$", and "$P6_2$" 14, plus the determined pseudorandom number coefficient "$r_{26}$" 20.

Also note in step 84 that if the decoder circuit 26 determines it does not have sufficient packets to solve using linear equations (e.g., in the case where the differentially-encoded data block "$P6_1$" 14 has not yet been received), the encoder circuit 28 can generate an output an aggressively encoded data block ("$P'(k)_N$") 14': as illustrated in FIG. 2, the aggressively-encoded data block ("$P'(k)_N$") 14, includes the last available differentially-encoded data block (e.g., $P(i)_N=P(i-1)_N+r_{Ni}*B_i$) 14, plus the partially decoded data elements that follow in sequence (e.g., i=i+1 to k) the differentially-encoded data block 44. Hence, as illustrated in FIG. 6B, the encoder circuit 28 of the network node "N4" can generate in step 92 of FIG. 3 the following aggressively-encoded history packet 14':

$$P'5_4=P3_4+r_{14}B_4+r_{15}B_5 \quad (8).$$

Note that the encoder circuit 28 also inserts into the aggressively-encoded packet 42 the coefficients 46 for each of the partial blocks "$r_{14}B_4$" and "$r_{15}B_5$" 70, since the receiving network node (e.g., "N5" of FIG. 1) may not be able to determine the pseudorandom coefficients 46 because they are from another source. The encoder circuit 28 also inserts within the aggressively-encoded packet 42 a block identifier 69 of the last partially encoded block, enabling the receiving network node to distinguish between the last fully encoded block "P3$_4$" 14 and the partially encoded blocks "$r_{14}B_4$" and "$r_{15}B_5$" 70. Hence, the encoder circuit 28 can provide additional partially decoded data elements 70 with almost no increase in overhead, resulting in reduced propagation delay based on enabling the receiving network node to initiate decoding using the partially encoded blocks 70.

FIG. 5B also illustrates the solution by the decoder circuit 26 in step 86 for solving the respective values of the data blocks "$B_7$", "$B_8$", and "$B_9$" 22 based on the bound partially decoded data elements 94 in the decoding matrices 56*a*, 56*b*, and 56*c*, due to the absence of the differential-encoded data structures "P7$_1$", "P7$_2$", "P7$_3$", "P8$_1$", "P8$_2$", and "P8$_3$". As illustrated in FIG. 5B, the decoding circuit 26 can solve for three unknowns using three equations, enabling the simultaneous decoding and rendering of the three data blocks "$B_7$", "$B_8$", and "$B_9$" 22. As apparent from the foregoing, a preferred decoding window size can be applied to the decoding matrices 56*a*, 56*b*, and 56 *c* to ensure that there is no interruption in the rendering of the data packets in real time by the rendering circuit 30. In particular, the decoding matrices 56 each can be implemented as a fixed sized matrix in hardware memory (e.g., DRAM) having a sufficient size to cover a burst error rate for the missing packets. For example, each of the decoding matrices 56 can be implemented have a row and column size of at least two (2) plus the average number of sourcing network nodes; assuming as illustrated in FIG. 4 that an average of three (3) sourcing network nodes is expected, the average window size for each decoding matrix 56 can be 5×5. Consequently, if in step 96 the decoding circuit 26 determines that the window size required for real-time rendering by the rendering circuit 30 is exceeded, the decoding circuit 26 can purge in step 98 the aged data, which will be perceptible as a momentary delay in the rendering by the rendering circuit 30.

According to the example embodiments, streaming network coding can be deployed within a network that enables virtually unlimited distribution among peer network nodes, based on minimizing overhead within the transmitting packets by eliminating the necessity of a matrix of coefficients used to generate the encoded data; rather, each receiving network node can recalculate the set of randomized coefficients used for encoding, based on identifying the sourcing network node and the corresponding position of the encoded data block within the ordered sequence of a stream of data blocks. If desired, aggressively-encoded packets having a limited number of coefficients can be deployed in localized networks (e.g., local area networks), where a higher throughput speed is desired, and network capacity is adequate to accommodate the larger-sized aggressively-encoded packet.

In addition, each network node can instantaneously began decoding the data blocks based on receiving two adjacent differentially-encoded data blocks (e.g., a differentially-encoded data block and a corresponding successively-preceding differentially-encoded data block); hence, the example embodiments eliminate the latency that can be encountered by existing network coding procedures, where a receiving network node must wait for a prescribed number "n" of data packets (corresponding to the number of data blocks that are encoded by a linear combination of the data blocks for a given generation of data using an n×n matrix) before decoding can begin. Further, the encoding using a corresponding randomization seed assigned to each network node guarantees that each differentially-encoded data block has a high probability of being unique, eliminating the concern of peer-management systems that manage the distribution of encoded data packets, the associated wasted bandwidth and overhead due to a given network node receiving duplicate packets from different sources, or deploying management protocols to prevent receiving network nodes from receiving the duplicate packets.

Hence, every innovative packet received from a given source enables instantaneous decoding of one data block, without delay; further, the loss of a packet need not delay the decoding of future blocks, since multiple data blocks can be simultaneously decoded upon reception of additional packets to solve for the unknown variables. Further, the size of decoding matrices can be minimized, on the order of several packets, since each encoded data packet is a differential of a prior encoded packet, and does not require an entire domain of packets encoded across an n-dimensional matrix.

It will be readily apparent from the foregoing that various optimization procedures can be implemented between the peer network nodes 12; for example the network interface circuit 24 in each peer network node 12 can include a management circuit (not shown) configured for establishing connections with more reliable network nodes that supply packets 40 or 42 at a lower packet error rate, and ignoring packets from other network nodes that are more unreliable. Further, the management circuit in the network interface circuit 24 can be configured for monitoring its transmitting link bandwidth relative to its receiving link bandwidth, to ensure that the total data rate between receiving the data streams from the multiple sourcing network nodes and transmitting the encoded data streams to other peer network nodes does not exceed the capacity of the links 16. As apparent from the foregoing, however, the network interface circuit 24 can send a subset of the available differentially-encoded data blocks, for example every alternate differentially-encoded data block or every third differentially-encoded data block in the ordered sequence, since a receiving peer network node still can use the sporadic differentially-encoded data blocks to decode the data blocks using linear equations as illustrated above with respect to FIGS. 5A and 5B.

It will be noted that various modifications can be applied; for example, the disclosed multiplication, division, addition and subtraction operations can be implemented using alternative digital operations as appropriate, for example bit-shifting operations, 1's complement or 2's complement addition, exclusive-or (XOR) operations, or hashing operations.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method for multicasting data to one or more peer network nodes in a network having physical links, the method comprising:

supplying, by a network node to one or more of the peer network nodes in the network, a randomization seed assigned to the network node for generating a prescribed sequence of pseudorandom numbers according to a prescribed pseudorandom number generation function;

encoding each data block having a corresponding position in an ordered sequence of a stream of data blocks, by the network node into a corresponding differentially-encoded data block based on applying a product of the corresponding data block and the corresponding pseudorandom number, having the corresponding position in the prescribed sequence, to its successively-preceding differentially-encoded data block from the ordered sequence, the data block recoverable solely by dividing a determined difference, of the corresponding differentially-encoded data block subtracted by its successively-preceding differentially-encoded data block, by the corresponding pseudorandom number; and outputting, by the network node to one or more of the peer network nodes via one or more of the physical links, each differentially-encoded data block in a corresponding packet that identifies the network node and the corresponding position, wherein the one or more peer network nodes can recover the data block based on two successive differentially-encoded data blocks and the corresponding randomization seed.

2. The method of claim 1, wherein the outputting comprises identifying the network node within one of a link layer address field or a network layer address field of the corresponding packet.

3. The method of claim 1, further comprising outputting each packet carrying the corresponding differentially-encoded data block to the peer network nodes.

4. The method of claim 1, further comprising:

receiving first data packets from a first source network node, each of the first data packets including a corresponding first differentially-encoded data block having been encoded based on the corresponding randomization seed assigned to the first source network node;

obtaining at least a subset of the data blocks, from at least the first data packets, based on decoding the first differentially-encoded data blocks based on determining respective pseudorandom number coefficients from a stored copy of the corresponding randomization seed assigned to the first source network node, and based on determining a difference between successive first differentially-encoded data blocks.

5. The method of claim 4, further comprising:

receiving second data packets from a second source network node, each of the second data packets including a corresponding second differentially-encoded data block having been encoded based on the corresponding randomization seed assigned to the second source network node;

the obtaining including obtaining the data blocks based on determining the respective pseudorandom number coefficients from a stored copy of the corresponding randomization seed assigned to the second source network node, and based on applying partially decoded data elements from the first data packets and the second data packets.

6. The method of claim 4, further comprising rendering the data blocks as a real-time media stream.

7. The method of claim 1, wherein the data block can be instantaneously decoded and rendered based solely on the corresponding differentially-encoded data block, the corresponding successively-preceding differentially-encoded data block, and the corresponding pseudorandom number.

8. The method of claim 1, wherein each differentially-encoded data block contains the history of all prior data blocks multiplied by their respective pseudorandom numbers.

9. An apparatus for multicasting data to one or more peer network nodes in a network having physical links, the apparatus comprising:

a network interface circuit configured for supplying, to one or more of the peer network nodes in the network, a randomization seed assigned to the apparatus for generating a prescribed sequence of pseudorandom numbers according to a prescribed pseudorandom number generation function; and an encoding circuit configured for encoding each data block having a corresponding position in an ordered sequence of a stream of data blocks, into a corresponding differentially-encoded data block based on applying a product of the corresponding data block and the corresponding pseudorandom number, having the corresponding position in the prescribed sequence, to its successively-preceding differentially-encoded data block from the ordered sequence, the data block recoverable solely by dividing a determined difference, of the corresponding differentially-encoded data block subtracted by its successively-preceding differentially-encoded data block, by the corresponding pseudorandom number;

the network interface circuit further configured for outputting, to one or more of the peer network nodes via one or more of the physical links, each differentially-encoded data block in a corresponding packet that identifies the apparatus and the corresponding position, wherein the one or more peer network nodes can recover the data block based on two successive differentially-encoded data blocks and the corresponding randomization seed.

10. The apparatus of claim 9, wherein the each packet identifies the apparatus within one of a link layer address field or a network layer address field.

11. The apparatus of claim 9, wherein the network interface circuit is configured for outputting each packet carrying the corresponding differentially-encoded data block to the peer network nodes.

12. The apparatus of claim 9, wherein:

the network interface circuit is configured for receiving first data packets from a first source network node, each of the first data packets including a corresponding first differentially-encoded data block having been encoded based on the corresponding randomization seed assigned to the first source network node;

the apparatus further comprises a decoding circuit configured for obtaining at least a subset of the data blocks, from at least the first data packets, based on decoding the first differentially-encoded data blocks based on determining respective pseudorandom number coefficients from a stored copy of the corresponding randomization seed assigned to the first source network node, and based on determining a difference between successive first differentially-encoded data blocks.

13. The apparatus of claim 12, wherein:

the network interface circuit is configured for receiving second data packets from a second source network node, each of the second data packets including a corresponding second differentially-encoded data block having been encoded based on the corresponding randomization seed assigned to the second source network node;

the decoding circuit configured for obtaining the data blocks based on determining the respective pseudorandom number coefficients from a stored copy of the corresponding randomization seed assigned to the second source network node, and based on applying partially decoded data elements from the first data packets and the second data packets.

14. The apparatus of claim 12, further comprising a rendering circuit configured for rendering the data blocks as a real-time media stream.

15. The apparatus of claim 9, wherein the data block can be instantaneously decoded and rendered based solely on the corresponding differentially-encoded data block, the corresponding successively-preceding differentially-encoded data block, and the corresponding pseudorandom number.

16. The apparatus of claim 9, wherein each differentially-encoded data block contains the history of all prior data blocks multiplied by their respective pseudorandom numbers.

17. An apparatus for multicasting data to one or more peer network nodes in a network having physical links, the apparatus comprising:

means for supplying, to one or more of the peer network nodes in the network, a randomization seed assigned to the apparatus for generating a prescribed sequence of pseudorandom numbers according to a prescribed pseudorandom number generation function; and means for encoding each data block having a corresponding position in an ordered sequence of a stream of data blocks, into a corresponding differentially-encoded data block based on applying a product of the corresponding data block and the corresponding pseudorandom number, having the corresponding position in the prescribed sequence, to its successively-preceding differentially-encoded data block from the ordered sequence, the data block recoverable solely by dividing a determined difference, of the corresponding differentially-encoded data block subtracted by its successively-preceding differentially-encoded data block relative to the corresponding pseudorandom number;

the means for supplying further configured for outputting, to one or more of the peer network nodes via one or more of the physical links, each differentially-encoded data block in a corresponding packet that identifies the apparatus and the corresponding position, wherein the one or more peer network nodes can recover the data block based on two successive differentially-encoded data blocks and the corresponding randomization seed.

18. The apparatus of claim 17, wherein the data block can be instantaneously decoded and rendered based solely on the corresponding differentially-encoded data block, the corresponding successively-preceding differentially-encoded data block, and the corresponding pseudorandom number.

19. The apparatus of claim 17, wherein each differentially-encoded data block contains the history of all prior data blocks multiplied by their respective pseudorandom numbers.

* * * * *